3,119,878
PREPARATION OF BORON FUELS
Carl T. Severini, Evans City, Pa., assignor to Callery Chemical Company, Pittsburgh, Pa., a corporation of Pennsylvania
No Drawing. Filed Feb. 20, 1958, Ser. No. 716,509
9 Claims. (Cl. 260—606.5)

This invention relates to boron containing high energy fuels, and more particularly to liquid and solid boron containing high energy fuels and methods for producing them.

In recent years there has been ever increasing interest in high energy fuels in general, and particularly in liquid and solid fuels other than hydrocarbon fuels. The characteristics which determine the desirability of a product as a high energy fuel include certain physical properties, e.g., stability, viscosity, density etc., as well as its heat of combustion and specific impulse compared to conventional hydrocarbon fuels. Liquid fuels containing boron have recently become available which meet the requirements for high energy fuel. A variety of processes for preparation of such boron containing fuels have been developed, but in general they all depend upon the reaction of boron hydrides with unsaturated hydrocarbons, and the liquid products obtained all contain alkylated higher boranes, i.e., boranes with from 4 to 10 boron atoms per molecule. Many of these processes are described in copending applications of common ownership with this application. For example, Eads and Brandt, Ser. No. 546,817, filed November 14, 1955, now Patent No. 3,057,924, describes a method of preparing a high energy fuel by the co-pyrolysis of excess diborane and ethylene at superatmospheric pressure; Huff and Hunt, Ser. No. 546,822, filed November 14, 1955, now abandoned, describes a process in which diborane is reacted with the reaction product of diborane and an unsaturated lower aliphatic hydrocarbon at elevated pressures. Other processes for preparing similar crude liquid boron fuels are described in the copending, coassigned applications of Lichtenwalter, Ser. No. 534,733, filed September 16, 1955, now abandoned; Lichtenwalter and Harwell, Ser. No. 569,945, filed March 6, 1956, now Patent No. 2,979,530; Brault and Huff, Ser. No. 507,723, filed May 10, 1955, now abandoned; and Judd and Richmond, Ser. No. 605,688, filed August 20, 1956. A recently developed process for preparing crude liquid boron fuels is described in the coassigned application of Eads, Wagner and Kendrick, Ser. No. 716,514, filed on even date herewith.

By crude liquid boron fuel as that term is used throughout the following specification and claims is meant a composition containing boron, carbon and hydrogen and which contains substantial amounts of alkylated higher boron hydrides, i.e., having 4 to 10 boron atoms per molecule. Such compositions are obtained as the product of various processes, such as those described in the above mentioned applications, in which boron hydrides and unsaturated hydrocarbons are reacted at varying conditions of temperature and pressure. In some of these processes, a product of diborane and an unsaturated hydrocarbon, e.g., alkyldiboranes, is first obtained and then reacted with a boron hydride, while in others the unsaturated hydrocarbon is reacted with a boron hydride to produce a crude liquid boron fuel directly. Other similar methods may also be used to produce crude liquid boron fuels.

The crude liquid boron fuels vary in their exact composition, but in general they all contain substantial amounts of alkylated higher boron hydrides, such as alkyl decaboranes and alkyl pentaboranes. Although these crude fuels have a high heat of combustion compared to hydrocarbon fuels and thus are useful as high energy fuels, their usefulness for certain purposes is somewhat limited by undesirable physical characteristics. For example, these fuels tend to deposit gummy residues in storage apparatus and fuel lines, and their viscosity is higher than is desirable in many instances. Furthermore, although these liquid high energy fuels have provided a major improvement in the fuel art, for some applications, e.g., where the use of pumps and injection systems is not desirable, a solid fuel of similar high energy content is needed.

It is therefore an object of this invention to provide a liquid high energy boron fuel of improved physical characteristics. Another object is to provide a solid boron fuel of high energy content. A further object is to provide a method of improving the physical characteristics of crude liquid boron fuels, and a still further object is to provide a method of obtaining a solid boron fuel from the aforesaid crude liquid boron fuels.

This invention is based upon my discovery that crude liquid boron fuels contain certain components which are solid when isolated; that these components may be removed and isolated from the crude liquid boron fuels, leaving a liquid boron fuel of improved characteristics, by treatment with a fluid saturated hydrocarbon; and that these components when isolated are useful as a high energy solid boron fuel.

The removal of these normally solid components from crude liquid boron fuels results in a liquid boron fuel having improved physical characteristics and which is thus adapted for use in a wider range of applications. More specifically, the liquid boron fuels obtained have lowered viscosity, better thermal stability, and may be stored and pumped without appreciable deposition of gummy residues.

It has been found that the removal of these solid components may be effected by treatment of the crude liquid boron fuel with a fluid saturated hydrocarbon. Examples of hydrocarbons which may be used are n-propane, n-butane, n-pentane, n-hexane, n-heptane, 2,3-dimethylbutane, and cyclohexane. The preferred method of treatment is addition of the crude liquid boron fuel to an excess of the hydrocarbon whereupon the solid boron fuel precipitates in finely divided form. The liquid boron fuel remains as a solution in the hydrocarbon which may be separated from the solid boron fuel by decantation, filtration, centrifuging or other conventional means. The solution of fuel in hydrocarbon may be used as a fuel without separation, but generally it is preferred to separate the liquid boron fuel from the hydrocarbon; the hydrocarbon may then be recycled. The separation can be accomplished by any conventional method such as stripping, distillation or extraction.

Any normally fluid, i.e., gaseous or liquid, saturated hydrocarbon is useful in the practice of this invention. It is generally preferred to use one of low-molecular weight such as n-pentane or n-butane, especially where the liquid boron fuel is to be recovered free of solvent. The high volatility of these hydrocarbons makes separation by stripping, for example, easily carried out, while at the same time they are conveniently handled in liquid form. A further advantage is their low cost. It should be noted that the solid boron fuel must be separated from the solution while the hydrocarbon is in liquid form; if the hydrocarbon is allowed to evaporate before separation the precipitated solids recombine with the liquid boron fuel. When normally gaseous hydrocarbons are used, provision must be made for employing sufficiently low temperatures or high pressures so that the hydrocarbon is in liquid form during the treatment. Branched chain hydrocarbons, as well as other higher molecular weight liquid hydrocarbons may also be used, but the higher boiling points of these substances make recovery of the liquid boron fuel free of hydrocarbon more difficult.

The temperature at which the hydrocarbon treatment is carried out is not critical and is limited only by the stability of the crude liquid boron fuel treated. Ordinarily the treatment is carried out at room temperature, except when using normally gaseous hydrocarbons, when low temperatures may be used with good results. Thus solids were precipitated from a crude liquid boron fuel, prepared from ethyl diboranes and diborane under pressure, by treatment with n-propane at −50° C., n-butane at −10° C., and 2,3-dimethylbutane at room temperature, with comparable results in each case.

The following examples will serve to illustrate one method of carrying out the invention.

EXAMPLE 1

A 150 ml. sample of a crude liquid boron fuel, produced from the reaction of diborane with ethylene at about 80° C. followed by reaction with further diborane at about 150 p.s.i.g., was added slowly with stirring to a flask containing about 1500 ml. of n-pentane. Solids precipitated continuously during the addition. After all the fuel had been added, the solution was filtered and the pentane removed from the filtrate by distillation at reduced pressure. A total of 117 grams of liquid boron fuel was recovered, analyzing 53.2% boron and 33.6% carbon and having a viscosity of 9.99 centistokes at 23.5° C. and a net heat of combustion of 25,200 B.t.u. per pound. The filter cake consisted of a boron fuel in finely divided solid form.

EXAMPLE 2

A sample of product prepared according to the method described in the copending application of Lichtenwalter and Harwell, Ser. No. 569,945, filed March 6, 1956, was stripped of its more volatile components comprising mainly unreacted ethyl diboranes. The crude liquid boron fuel was then treated with n-pentane as described above. After filtration, the solids were dried and weighed; 10 wt. percent of the crude liquid boron fuel was recovered as solid boron fuel.

EXAMPLE 3

A 47 ml. sample of crude boron fuel containing 55% boron and 26% carbon was added to 200 ml. of n-pentane. The pentane was agitated during the addition. The solids which precipitated out were filtered and dried. They contained 54% boron and 25% carbon, and comprised 30.5 wt. percent of the original sample. The pentane solution was heated at 50° C. while passing nitrogen gas through the solution. After two hours all the pentane was removed and the liquid boron fuel remaining contained 57% boron and 31% carbon.

The results of other experiments carried out in a similar manner but on a larger scale are shown in Table I. The crude liquid boron fuel in each case was produced according to the methods described in the above mentioned applications. A 10 to 1 hydrocarbon to fuel volume ratio was used.

*Table I*

| Crude Fuel Charged | | Solid Fuel Recovered lbs. | Liquid Fuel Recovered | |
| --- | --- | --- | --- | --- |
| Lbs. | Percent B | | Lbs. | Percent B |
| 4.3 | 46 | 0.6 | 3.9 | 49 |
| 4.3 | 51 | 0.6 | 4.0 | 50 |
| 3.5 | 50 | 0.4 | 3.0 | 49.5 |
| 11.1 | | 0.9 | 9.5 | 43 |

As the above data indicate, the liquid boron fuel recovered has substantially the same boron content as the crude liquid boron fuel treated. Since the heat of combustion of a boron fuel is ordinarily directly proportional to the boron content, the treatment does not lower the fuel value of the liquid product.

Other tests have indicated that the best results are obtained when the crude liquid boron fuel is added to a large excess of hydrocarbon, e.g., about 15 to 1 volume ratio, where the volume is of the hydrocarbon in liquid form. Under these conditions, the solids are precipitated free of occluded liquid. When volume ratios below about 6 to 1 are used, the solids frequently require washing with additional or recycled hydrocarbon in order to recover all of the liquid boron fuel. Similarly, agitation and order of addition, although not critical to operability of the method, influence the form in which the solids are precipitated. When the crude liquid boron fuel is added to the hydrocarbon with stirring of the solution, less hydrocarbon may be used than if the hydrocarbon is added to the fuel.

Another method of carrying out the process, which has been used to recover the solid boron fuel from crude liquid boron fuel containing large amounts of solid components is to spray the crude liquid boron fuel as a fine stream or fog into a reservoir of hydrocarbon. This results in extremely fine droplets of fuel and prevents caking of the precipitate by producing solids of uniformly small particle size through which the supernatant liquor filters easily. It has been found when using this technique that a finer spray is obtained if the crude liquid boron fuel is heated prior to injection. The following examples illustrate this embodiment of the invention:

EXAMPLE 4

5 ml. of crude liquid boron fuel was heated by steam for about 10 minutes, then sprayed as a fog under 100–125 p.s.i. nitrogen pressure into 75 ml. of swirling n-pentane. Upon filtration of the resulting slurry, the rate of filtration was found to be 37.95 lb. solids per square foot per hour. The solid boron fuel recovered comprised 39.5% by weight of the original crude boron fuel.

EXAMPLE 5

Using conditions as in Example 4, except that the crude liquid boron fuel was not heated prior to being sprayed, the fuel did not fog even under 150 p.s.i. nitrogen pressure, but came out in a thin stream. A somewhat slower filtration rate was achieved, but the amount of solid boron fuel recovered corresponded closely to that in Example 4.

The liquid boron fuels recovered after the treatment described herein are high energy boron fuels and may be used in the same manner as the crude liquid boron fuels treated. Thus, when burned with conventional oxidizers, e.g., oxygen, they produce considerably more heat per pound than conventional hydrocarbon fuels.

The solid boron fuels which are recovered from crude liquid boron fuels by the method of this invention have not been fully characterized. Based on present knowledge, it is believed that they consist of polymers of boron, carbon, and hydrogen. Since these solid fuels always contain only boron, carbon and hydrogen, although in varying proportions, they are conveniently referred to collectively as B—C—H solids. Use of this term, however, is intended to show that they contain boron, carbon and hydrogen in varying proportions and varying numbers of atoms per molecule, and not to imply that the elements are present in a 1 to 1 to 1 atomic ratio. The B—C—H solids are ordinarily much richer in boron than in either carbon or hydrogen. In practically all instances the B—C—H solids recovered from a crude liquid boron fuel contain substantially the same proportions of boron and carbon as the crude liquid boron fuel being treated. Table II shows analysis of several representative samples of B—C—H solids and the analysis of the crude liquid boron fuel from which each was obtained.

*Table II*

| Crude Liquid Boron Fuel | | B—C—H Solids | |
|---|---|---|---|
| Boron (mat/g.) | Carbon (mat/g.) | Boron (mat/g.) | Carbon (mat/g.) |
| 55.6 | 24.8 | 52.8 | 14.9 |
| 44.8 | 31.0 | 40.8 | 20.6 |
| 56.5 | 19.3 | 51.3 | 16.3 |

The B—C—H solids are useful as a high energy fuel. As such they are useful in ordinary fuel applications, i.e., burned to produce heat which may be used to warm the surroundings, heat liquids etc. For example, when burned in an oxygen atmosphere, 1.7 g. of B—C—H solids produced heat sufficient to raise the temperature of 1 liter of water over 30° F. However, the B—C—H solids are particularly useful in applications wherein their high energy content is more economically utilized. They contain substantial amounts of boron, an element generally recognized as desirable in a high energy fuel, and have a heat of combustion approaching 25,000 B.T.U./lb. and sometimes higher, a decided improvement over other known solid high energy fuels. Such applications consist primarily as solid fuels for rocket and similar engines. When combined with conventional oxidizers in bipropellant systems, B—C—H solids burn with a high heat to produce gases of high exhaust velocity. The high temperature of burning together with the relatively low molecular weight of the combustion products result in a specific impulse higher than is obtainable with other solid fuels.

In addition to their use as solid boron fuels, the B—C—H solids may be used to prepare boron carbides by heating at elevated temperatures, e.g., 600° C., in a vacuum or in an inert atmosphere, until all volatile products are removed.

According to the principles of the patent statutes I have explained the principles and mode of operation of my invention together with what I now consider to be its best embodiments. However, it is to be understood that within the scope of the appended claims this invention may be practiced otherwise than as specifically described.

I claim:

1. In a method of preparing a boron fuel, the steps comprising reacting diborane with an unsaturated hydrocarbon to produce a crude liquid boron fuel containing substantial amounts of alkylated higher boron hydrides, mixing said crude liquid boron fuel with a fluid saturated hydrocarbon in liquid form, and separating the resultant solid boron fuel from the solution thus produced.

2. The steps according to claim 1 in which said fluid saturated hydrocarbon contains between 4 and 7 carbon atoms per molecule.

3. The steps according to claim 1 in which one part of said crude liquid boron fuel by volume is added to at least six parts of said fluid saturated hydrocarbon by volume.

4. The steps according to claim 3 in which said crude liquid boron fuel is added by spraying.

5. A method of separating a crude liquid boron fuel into a solid boron fuel and an improved liquid boron fuel comprising reacting diborane with an unsaturated hydrocarbon to produce a crude liquid boron fuel containing substantial amounts of alkylated higher boron hydrides, mixing said crude boron fuel with a fluid saturated hydrocarbon in liquid form to produce a solid phase and a solution of liquid boron fuel in said fluid saturated hydrocarbon, separating the solid phase boron fuel from the solution and recovering the improved liquid boron fuel from the solution in said fluid saturated hydrocarbon.

6. A method according to claim #5 in which said fluid saturated hydrocarbon contains between 4 and 7 carbon atoms per molecule.

7. A method according to claim 6 in which one part of said crude liquid boron fuel by volume is added to at least six parts of said fluid saturated hydrocarbon by volume.

8. A method according to claim 1 in which the crude liquid boron fuel is prepared by the reaction of ethylene and diborane at superatmospheric pressure.

9. As a new composition of matter, the B—C—H solids obtained by reacting diborane with an unsaturated hydrocarbon to produce a crude liquid boron fuel containing substantial amounts of alkylated higher boron hydrides, mixing said crude liquid boron fuel with a fluid saturated hydrocarbon in liquid form and separating the resultant B—C—H solids from the solution thus produced.

References Cited in the file of this patent

UNITED STATES PATENTS

| 2,151,432 | Lyons et al. | Mar. 21, 1939 |
| 2,257,194 | Rosen | Sept. 30, 1941 |
| 2,886,599 | Koster | May 12, 1959 |

OTHER REFERENCES

Hurd: J. Am. Chem. Soc., vol. 70 (1948), pp. 2053–5.

Schechter et al.: "Boron Hydrides and Related Compounds," 2nd ed., May 1954 (Callery Chem. Co., prepared in cooperation with Dept. of Navy, p. 33).

J. Organic Chem., vol. 22, pp. 1136–8 (1957).